United States Patent Office 3,546,292
Patented Dec. 8, 1970

3,546,292
B-NORESTRATRIENES
Vlasios Georgian, Belmont, Mass., and Francis R. Pfeiffer, Delran, N.J., assignors to Trustees of Tufts College, Medford, Mass., a corporation of Massachusetts
No Drawing. Filed Nov. 2, 1967, Ser. No. 680,035
Int. Cl. C07c 131/08
U.S. Cl. 260—566                2 Claims

ABSTRACT OF THE DISCLOSURE

8α - B-norestradiols and B-norestral-1,3,5(10),8,14-pentaene 17-oximes are prepared by a series of steps from 5-alkoxy-1-vinylindan-1-ols and 2-methyl or ethyl-cyclopentane-1,3-dione. The products have blood cholesterol-lowering activity.

This invention relates to B-norsteroid compounds having cholesterol-lowering properties. In particular, the invention relates to 8α-B-norestradiols and to B-norestra-1,3,5(10),8,14-pentaene 17-oximes.

The compounds of the invention are characterized by the following structural formulas:

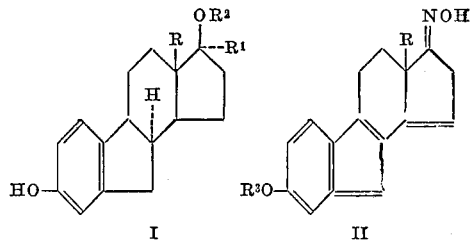

wherein:

R is methyl or ethyl;
$R^1$ is hydrogen, methyl, ethyl, or ethynyl;
$R^2$ is hydrogen or lower acyl of up to 5 carbon atoms; and
$R^3$ is hydrogen or lower alkyl of up to 4 carbon atoms.

These compounds are prepared by methods schematically outlined below:

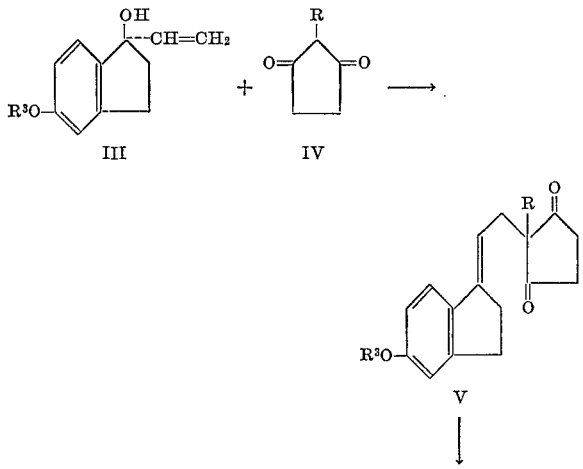

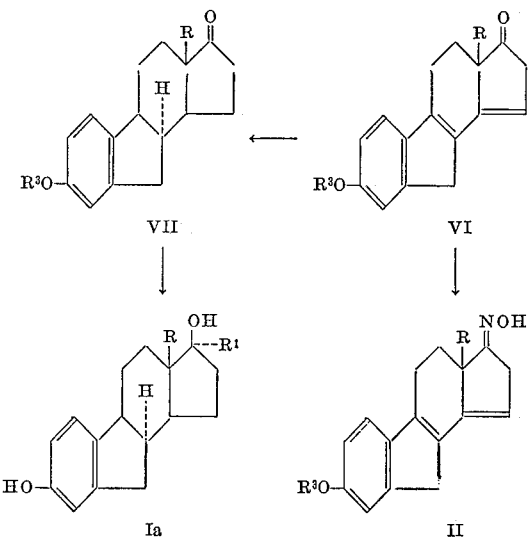

A 5-alkoxy-1-vinylindan-1-ol (III), prepared by treatment of a 5-alkoxyindan-1-one with excess vinyl magnesium chloride and then hydrolysis, is condensed with 2-methyl or ethylcyclopentane-1,3-dione (IV) in the presence of a catalytic amount of potassium hydroxide to give the 8,14-seco-B-nortetraene V. Cyclodehydration to the pentaene VI is achieved by warming the tetraene in a solvent such as chloroform or carbon tetrachloride in the presence of trifluoroacetic acid. Treatment of this pentaene with hydroxylamine gives an oxime of Formula II, the identity of the R and $R^3$ groups being dependent upon the particular 2-alkylcyclopentanedione and 5-alkoxy-1-vinylindanol used.

When the pentaene VI is reduced with sodium borohydride, the corresponding 17β-alcohol is obtained, and this pentaene alcohol is hydrogenated in ethanol using a palladium on charcoal catalyst at a pressure of one to three atmospheres to give an 8α-trien-17β-ol. This compound is separated from the 8β-isomer by oxidation with chromic acid and fractional crystallization of the resulting 17-keto compounds to give the 8α-17-ketotriene VII (R=alkyl).

Cleavage of the 3-ether grouping with pyridine hydrochloride at 200° gives the 3-alcohol (VII, $R^3$=H), and reduction of the 17-keto group with sodium borohydride gives the 17β-ol (Ia, $R^1$=H). Reaction of the 3-alkoxy-17-ketone (VII) with methyl magnesium bromide, ethyl magnesium bromide, or an alkali metal acetylide gives the 17α-methyl, ethyl or ethynyl 3-ethers which are then cleaved as above to give the 3-hydroxy products (Ia, $R^1$=CH$_3$, C$_2$H$_5$, C≡CH).

Compounds wherein $R^2$ is lower acyl are prepared by esterification of the 17-ol with an anhydride or acyl halide, including acetic anhydride, propionic anhydride, or butyryl chloride.

The product compounds of the invention are hypocholesteremic agents, lowering blood cholesterol levels while exerting little or no estrogenic effect. They are active in rats in subcutaneous doses of 2 mg./kg. The preferred compounds are 3-methoxy-B-norestra-1,3,5 (10),8,14-pentaen-17-one oxime (II, R, $R^3$=CH$_3$) and B-nor-8α-estra-1,3,5(10)-triene-3,17β-diol (I, R=CH$_3$; $R^1$, $R^2$=H).

The compounds are formulated for use in those instances where it is desired to lower plasma cholesterol levels by combining them with conventional pharmaceutical excipients to form tablets, capsules, and injectables.

The compounds of Formulas VI and VII, being intermediates useful for preparing the hypocholesteremic compounds of Formulas I and II, are considered part of the present invention.

The following examples are intended to illustrate the preparation of the compounds of the invention, but are not to be construed as limiting the scope thereof. Temperatures stated are in degrees centigrade.

EXAMPLE 1

3-methoxy-B-norestral-1,3,5(10),8,14-pentaen-17-one oxime

In a dry flask was placed 18.0 g. (0.111 mole) of 5-methoxyindan-1-one and 100 ml. of dry tetrahydrofuran. The resulting suspension was cooled to −78° under an atmosphere of nitrogen. Then 83 ml. of 1.796 M vinyl magnesium chloride in tetrahydrofuran was added dropwise and the resulting solution was stirred for an additional 1.5 hrs. at −78°, placed in an ice-salt bath and stirred 40 min. longer. The solution was recooled to −78° and 83 ml. of 2-propanol was added followed by 100 ml. of a saturated aqueous solution of tetrasodium ethylenediamine tetraacetate (pH 8.5). With vigorous stirring the suspension was warmed to 0° over 15 min., then diluted with 500 ml. of ether. The ether was decanted, more ether was added and decanted and the process repeated one more time. The combined ether extracts were washed with H$_2$O, dried (Na$_2$SO$_4$) and the ether was evaporated to a colorless syrup which was homogeneous on tlc. An infrared spectrum indicated a hydroxyl band (2.8μ) and no ketone band.

This carbinol, 5-methoxy-1-vinylindan-1-ol, was dissolved in 80 ml. of methanol and added dropwise over 45 min. to a refluxing solution of 12.4 g. (0.105 mole) of 2-methylcyclopentane-1,3-dione, 3 pellets of KOH and 80 ml. of methanol (maintaining the volume in the reaction flask at about 70-80 ml. by allowing methanol to evaporate as the carbinol solution was added). Then the solution was refluxed for 1.5 hr., concentrated and the residue partitioned between H$_2$O and ether. The ether layer was washed with 10% NaOH solution and H$_2$O, dried and concentrated to a yellowish syrup which crystallized when scratched. A crystallization from methanol afforded 3-methoxy - 8,14 - seco-B-norestra - 1,3,5(10),9(11)-tetraene-14,17-dione, M.P. 73–75°. The analytical specimen was prepared from 2-propanol; M.P. 86–87°.

To a solution of 20 g. (0.071 mole) of this seco compound in 500 ml. of CHCl$_3$ was added all at once 10 ml. of trifluoroacetic acid. The solution turned purplish-green and was immediately concentrated using a rotary evaporator (pot temperature at 40–45°). The purplish residue was triturated with a little acetone, filtered and recrystallized from acetone (charcoal) to yield 3-methoxy-B-norestra-1,3,5(10),8,14 - pentaen - 17-one, M.P. 159–160°. Two more recrystallizations gave the analytical sample, M.P. 161–162°; ultraviolet maxima at 224 mμ (ε 13,100), 232 (11,500), 240 (8,400), and 308 (27,700); infrared absorption at 5.72μ; and nmr peaks at δ 1.17, δ 3.84, δ 5.78, and δ 6.74–7.29

The oxime was prepared by refluxing a solution of 750 mg. of the pentaene ketone, 300 mg. of hydroxylamine hydrochloride, 600 mg. of sodium acetate and 50 ml. of methanol for 1 hr. There was obtained the product oxime which was crystallized from 2-propanol, M.P. 198–200°; ultraviolet maximum at 305.5 mμ (ε 30,100); and nmr peaks at δ 1.25, δ 3.85, and δ 5.59.

EXAMPLE 2

B-nor-8α-estra-1,3,5(10)-triene-3,17β-diol

A suspension of 12.85 g. of 3-methoxy-B-norestra-1,3,5(10),8,14-pentaen-17-one in 400 ml. of methanol was treated portionwise over 15 minutes with 7 g. of NaBH$_4$. The resulting solution boiled spontaneously and was stirred at room temperature for 1.5 hr. A solid precipitated after about 0.5 hr. After acidification with acetic acid, most of the methanol was evaporated in vacuo and the residue was suspended in H$_2$O. The pale yellow solid was filtered and dried to afford 3-methoxy-B-norestra-1,3,5(10),8,14 - pentaen - 17β-ol, M.P. 163–165°. Crystallization from methanol gave golden crystals, M.P. 168–170°, raised after another crystallization to 169–170°; ultraviolet maximum at 307 mμ (ε 30,200); infrared absorption at 2.87 and 6.26μ; and nmr peaks at δ 1.01, δ 3.82, and δ 5.42.

In a Parr hydrogenation apparatus was placed a mixture of 6.8 g. of the above pentaene, 250 ml. of 95% ethanol and 1.5 g. of 10% Pd/C. The initial hydrogen pressure was 50 p.s.i. and after 10 minutes of shaking the uptake of two moles of hydrogen was complete. Filtration and concentration of the filtrate afforded a colorless syrup. An nmr spectrum of the crude product exhibited two angular methyl resonances at δ 0.81 and δ 0.88 in a ratio of 1 to 9, respectively. This mixture was oxidized directly by dissolving in 350 ml. of acetone and adding excess 8 N chromic acid at 0°. The reaction mixture was quenched with ice H$_2$O, extracted with ether and the ether extracts washed with 5% NaHCO$_3$ solution and H$_2$O. Evaporation of the solvent afforded yellow, oily crystals which were recrystallized from methanol to give white 3-methoxy-B-nor-8α - estra - 1,3,5(10)-trien-17-one, M.P. 113–116°. Another crystallization from methanol gave a M.P. 118–120°. The analytical specimen melted at 121–123°; ultraviolet maxima at 224 mμ (ε 7,300), 280 (3,000) and 286 (2,700); infrared absorption at 5.74, 6.18 and 6.31 μ; and nmr peaks at δ 1.00 and δ 3.78. A mixture of 550 g. of the above 3-methoxy compound and 10 g. of pyridine hydrochloride under nitrogen was introduced into a metal bath which had been preheated to 210°. The internal temperature of the reaction flask was maintained at 190–200° for 1.5 hr., cooled, and the mixture partitioned between ethyl acetate and dilute HCl. The organic phase was washed with H$_2$O, NaHCO$_3$ solution, H$_2$O again and the solvent dried (NaSO$_4$). Evaporation of the ethyl acetate led to a buff crystalline residue which was crystallized from methanol to afford 3-hydroxy-B-nor-8α - estra - 1,3,5(10-trien-17-one, M.P. 258–260°. The analytical sample (from methanol) had M.P. 265–267°; ultraviolet maxima at 224 mμ (ε 5800), 280 (3100) and 286 (2800); infrared absorption at 2.91, 5.77, 6.17 and 6.26μ.

To a suspension of 360 mg. of the above ketone in 80 ml. of methanol was added 500 mg. of NaBH$_4$ and the resulting solution was stirred at room temperature for 2 hr. After neutralizing with acetic acid, the solvents were evaporated in vacuo to yield a white crystalline residue. One recrystallization from methanol furnished the pure product, M.P. 189–190°; ultraviolet maxima at 281 mμ (ε 3050) and shoulder at 286 mμ.

EXAMPLE 3

When 2-ethylcyclopentane-1,3-dione is reacted with 5-methoxy-1-vinylindan-1-ol according to the procedure of Example 1 instead of 2-methylcyclopentane-1,3-dione, and the resulting secotetraene cyclodehydrated with trifluoroacetic acid as described therein, 3-methoxy-18-homo-B-norestra-1,3,5(10),8,14 - pentaen-17-one is obtained. Reaction with hydroxylamine gives the oxime.

When the pentaene is first reduced with sodium borohydride and then catalytically hydrogenated according to the procedure of Example 2, and the resulting product oxidized with chromic acid, 3-methoxy-18-homo - B-nor-8α-estra-1,3,5(10)-trien-17-one is obtained.

Ether cleavage with pyridine hydrochloride and sodium borohydride reduction give 18-homo-B-nor-8α - estra-1,3,5(10)-triene-3,17β-diol.

EXAMPLE 4

A solution of 2 g. of 3-methoxy-B-nor-8α-estra-1,3,5 (10)-trien-17-one in 100 ml. of benzene is allowed to react with an excess of ethereal 3 M methyl magnesium bromide in ether. The mixture is refluxed for 2 hours, quenched over ice, acidified with conc. HCl, and extracted with methylene chloride. The extracts are evaporated to give 3-methoxy-17α-methyl-B-nor-8α - 1,3,5(10) - trien - 17β-ol.

Use of ethyl magnesium iodide instead of methyl magnesium bromide gives the 17α-ethyl compound.

When these compounds are cleaved with pyridine hydrochloride as described in Example 2, 17α-methyl-B-nor-8α-estra - 1,3,5(10) - triene - 1,17β - diol and 17α-ethyl-B-nor-8α-estra-1,3,5(10)-triene - 3,17β-diol, respectively, are obtained.

EXAMPLE 5

A mixture of 2.5 g. of potassium reacted with 100 ml. of amyl alcohol and 100 ml. of dry ether is cooled and dry acetylene is flushed through the mixture for 2 hours. 3 - methoxy-B-nor-8α-estra-1,3,5(10) - trien - 17 - one (2.5 g.) is added and the flushing continued for 4 hours. The ice bath is removed and the acetylene flushing continued for 12 hours. After addition of 10% NH₄Cl solution and 150 ml. of water, the organic layer is separated and the aqueous layer is extracted with fresh portions of ether. The combined ether extracts are dried and evaporated to a residue which is dissolved in 50 ml. of 50% aqueous acetic acid. The reaction mixture is heated on the steam bath for 30 minutes, diluted with water, and extracted with methylene chloride. The organic extracts are dried and evaporated to give 17α-ethynyl-3-methoxy-B-nor-8α-estra-1,3,5(10)-trien-17β-ol. Cleavage with pyridine hydrochloride gives 17α-ethynyl-B-nor-8α-estra-1,3,5 (10)-triene-3,17β-diol.

EXAMPLE 6

To a suspension of 360 mg. of 3-methoxy-B-nor-8α-estra-1,3,5(10)-trien-17-one in 80 ml. of methanol is added 500 mg. of NaBH₄ and the resulting solution stirred at room temperature for 2 hours. After neutralizing with acetic acid, the solvents are evaporated in vacuo to give 3-methoxy-B-nor-8α-estra-1,3,5(10)-trien-17β-ol.

A mixture of 1 g. of 3-methoxy-B-nor-8α-estra-1,3,5-(10)-trien-17β-ol, 5 ml. of pyridine, and 2.5 ml. of acetic anhydride is warmed and then allowed to sit overnight at room temperature. The mixture is then poured into ice water and the 17-acetate of the starting material isolated by filtration or by extraction with a solvent such as ether or chloroform.

Use of propionic, butyric, valeric anhydrides or acid chlorides results in the formation of the corresponding 17-esters.

When these 3-methoxy-17-esters are treated with pyridine hydrochloride at 190–200° as described in Example 2, the respective 3-hydroxy-17-esters are obtained.

EXAMPLE 7

When 5-ethoxy, propoxy, and butoxy-1-vinylindan-1-ol are substituted for 5-methoxy-1-vinylindan-1-ol in Example 1, and the cyclodehydration step carried out as described therein, 3-ethoxy, propoxy, and butoxy-B-norestra-1,3,5(10),8,14-pentaen-17-one are obtained, respectively.

When these compounds are treated with hydroxylamine hydrochloride according to the procedure of that example, the respective 3-alkoxy 17-oximes are obtained.

We claim:
1. A compound having the structural Formula II

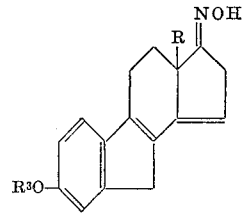

wherein:
R is methyl or ethyl, and
R³ is hydrogen or lower alkyl of up to 4 carbon atoms.

2. A compound according to claim 1, in which R and R³ are each methyl, being the compound 3-methoxy-B-norestra-1,3,5(10),8,14-pentaen-17-one oxime.

References Cited

UNITED STATES PATENTS

| | | | |
|---|---|---|---|
| 3,271,426 | 8/1966 | Villani | 260—397.5 |
| 3,300,484 | 1/1967 | Pappo | 260—239.5 |
| 3,377,361 | 4/1968 | Fare et al. | 260—345.9 |

LEON ZITVER, Primary Examiner

GERALD A. SCHWARTZ, Assistant Examiner

U.S. Cl. X.R.

260—488, 586, 617, 999